United States Patent

Ahs

Patent Number: 5,371,959
Date of Patent: Dec. 13, 1994

[54] POINTING DEVICE CARRIED BY DIGGING ARM OF EXCAVATOR, FOR DYNAMICALLY INDICATING LOCATION AND DIRECTION OF EXTENSION OF UNDERGROUND CABLE

[75] Inventor: Wilgot Ahs, Koppom, Sweden

[73] Assignee: Servoindikator HB, Karlstad, Sweden

[21] Appl. No.: 916,110

[22] PCT Filed: Dec. 11, 1991

[86] PCT No.: PCT/EP91/00852
§ 371 Date: Jul. 29, 1992
§ 102(e) Date: Jul. 29, 1992

[87] PCT Pub. No.: WO92/10619
PCT Pub. Date: Jun. 25, 1992

[30] Foreign Application Priority Data
Dec. 14, 1990 [SE] Sweden ............... 9004002-3

[51] Int. Cl.⁵ ............... E02F 9/26; G01V 3/11
[52] U.S. Cl. ............... 37/443; 37/906; 414/385; 324/326
[58] Field of Search ............... 324/67, 66, 326–329, 324/246, 260; 414/685, 690, 699; 37/906, 443

[56] References Cited

U.S. PATENT DOCUMENTS

| | | | |
|---|---|---|---|
| 3,418,572 | 12/1968 | Humphreys, Jr. | 324/67 |
| 3,617,865 | 11/1971 | Hakata | 324/67 X |
| 3,858,737 | 1/1975 | Senoo . | |
| 3,916,298 | 10/1975 | Ulrich | 324/67 X |
| 4,600,356 | 7/1986 | Bridges et al. | 414/694 |
| 4,652,861 | 3/1987 | Domes | 324/67 X |
| 5,027,108 | 6/1991 | Gray | 324/67 X |

FOREIGN PATENT DOCUMENTS

| | | |
|---|---|---|
| 0046854 | 3/1982 | European Pat. Off. . |
| 0388568 | 12/1989 | European Pat. Off. . |

*Primary Examiner*—Gerard R. Strecker
*Assistant Examiner*—Warren S. Edmonds
*Attorney, Agent, or Firm*—Cushman Darby & Cushman

[57] ABSTRACT

A pointer intended for attachment to the digging arm of an excavator, is characterized by an elongated arm which can be pivoted on the digging arm using a drive whose driving movements are activated and controlled by the magnetic field generated by an underground cable, conduit or like conductor in a manner such as to cause the pointer to point towards the cable, conduit or like conductor independently of the position of the digging arm.

4 Claims, 3 Drawing Sheets

POINTING DEVICE CARRIED BY DIGGING ARM OF EXCAVATOR, FOR DYNAMICALLY INDICATING LOCATION AND DIRECTION OF EXTENSION OF UNDERGROUND CABLE

BACKGROUND OF THE INVENTION

The present invention relates to a pointer for attachment to the digging arm of a mechanical excavator or digging machine, or to some other appropriate part of said machine.

Valuable assets are lost annually as a result of severing or destroying underground cables and underground conductors during ground excavating work carried out with the aid of excavating or digging machines. Hitherto, no effective method has been proposed which will enable the extension of underground cables, etc., to be detected and marked-out before commencing the excavation work. For instance, hitherto, the presence of an underground cable has been localized by detecting its magnetic field in accordance with standard methods and determining the position and the geometric extension of the cable on the basis thereof. The extension of the cable is then marked with the aid of pegs driven into the ground. In the case of cables which are not conducting or in the case of waterpipes or optical cables which are either surrounded by a metal screen or include an aluminium strip, the underground object has been detected with the aid of an active transmitter and receiver with the aid of overhead induction, whereafter the position of the cable or conduit is again marked with the aid of pegs driven into the ground.

One drawback is that the pegs become broken or are inadvertantly moved, or quite simply removed, causing uncertainty as to the actual position of the cable. The cable is often severed or dug up even when the pegs remain in position.

The object of the present invention is to provide a pointer which will constantly point to or indicate the location of an underground cable during an excavating operation, so that the machine operator can avoid cutting through or digging-up the cable or conduit.

BRIEF DESCRIPTION OF THE DRAWINGS

The invention will now be described in more detail with reference to an exemplifying embodiment thereof and also with reference to the accompanying drawings, in which.

DETAILED DESCRIPTION

Figure 4:
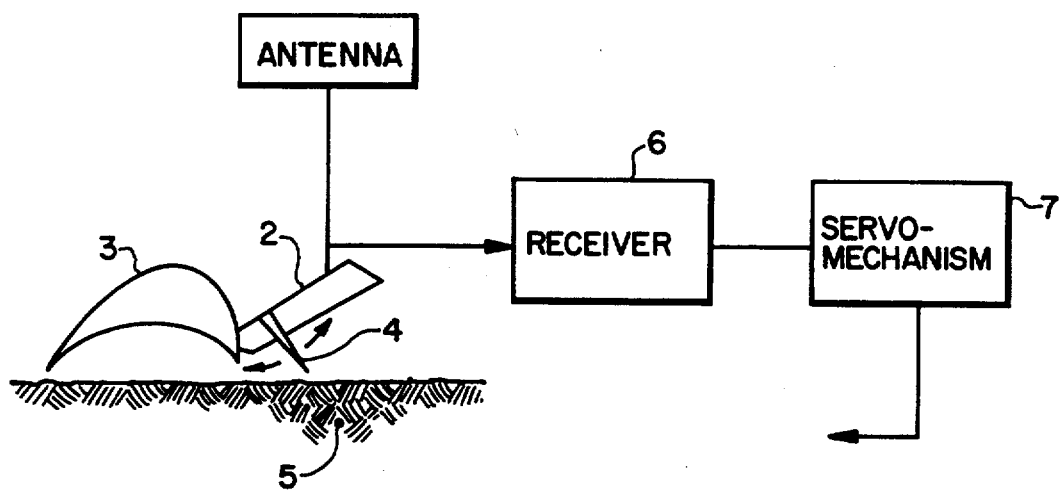
FIGS. 4 and 5 are schematic illustrations of the working method of the device.
Figure 5:
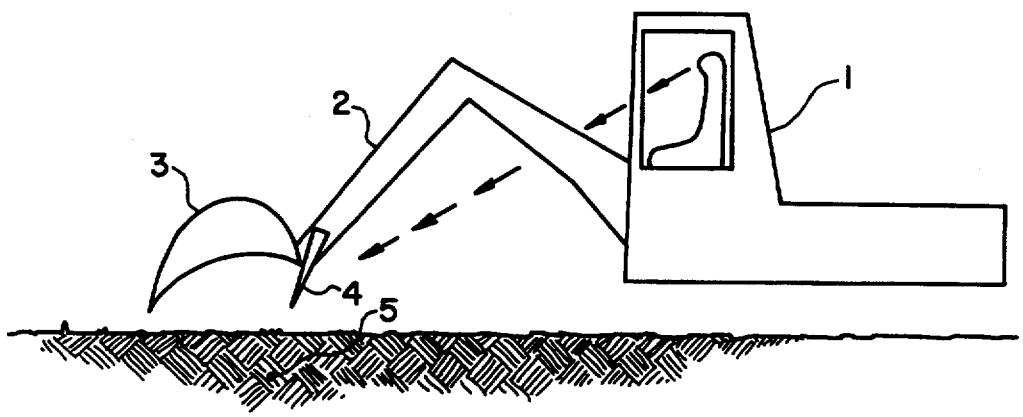

Reference is made first to FIGS. 4 and 5, which illustrate the method of operation of the invention schematically. A digging arm 2 of an excavating machine 1 carries a bucket 3 which is equipped with a pointer 4 constructed in accordance with the invention. The reference numeral 5 identifies an underground cable. The pointer 4 has the form of an elongated arm which can be swung about an axle which extends generally at right angles the plane of the paper, by means of a drive means. A receiver 6 receives and converts the signals produced by an antenna system mounted on the pointer 4, the signals received deriving from the magnetic field generated by the cable 5. The receiver output signals are processed in computers and are used to control drive means, in the form of a servomechanism 7, in a manner to position the pointer in the direction in which the strongest magnetic field is detected, i.e. towards the cable 5. Thus, by observing the pointer 4, the machine operator is able to determine the position of the cable 5 precisely during the whole duration of an excavating operation, irrespective of the movement of the digging arm 2 and the bucket 3.

In those cases when the cable 5 is not current-conducting or consists of an optocable, which is normally provided with a metal screen or an aluminium strip, or when the underground object is a water pipe instead of a cable 5, there is used a transmitter for generating a magnetic field whereby an electric current can be induced in the non-conducting cable, the optocable or the water pipe, and the magnetic field generated by this current can be detected in the aforedescribed manner. The transmitter is preferably mounted on the excavating machine.

The principles described briefly above for detecting the presence of an underground cable, pipe or like conductor are well known to the art and form no part of the present invention.

Figure 1:
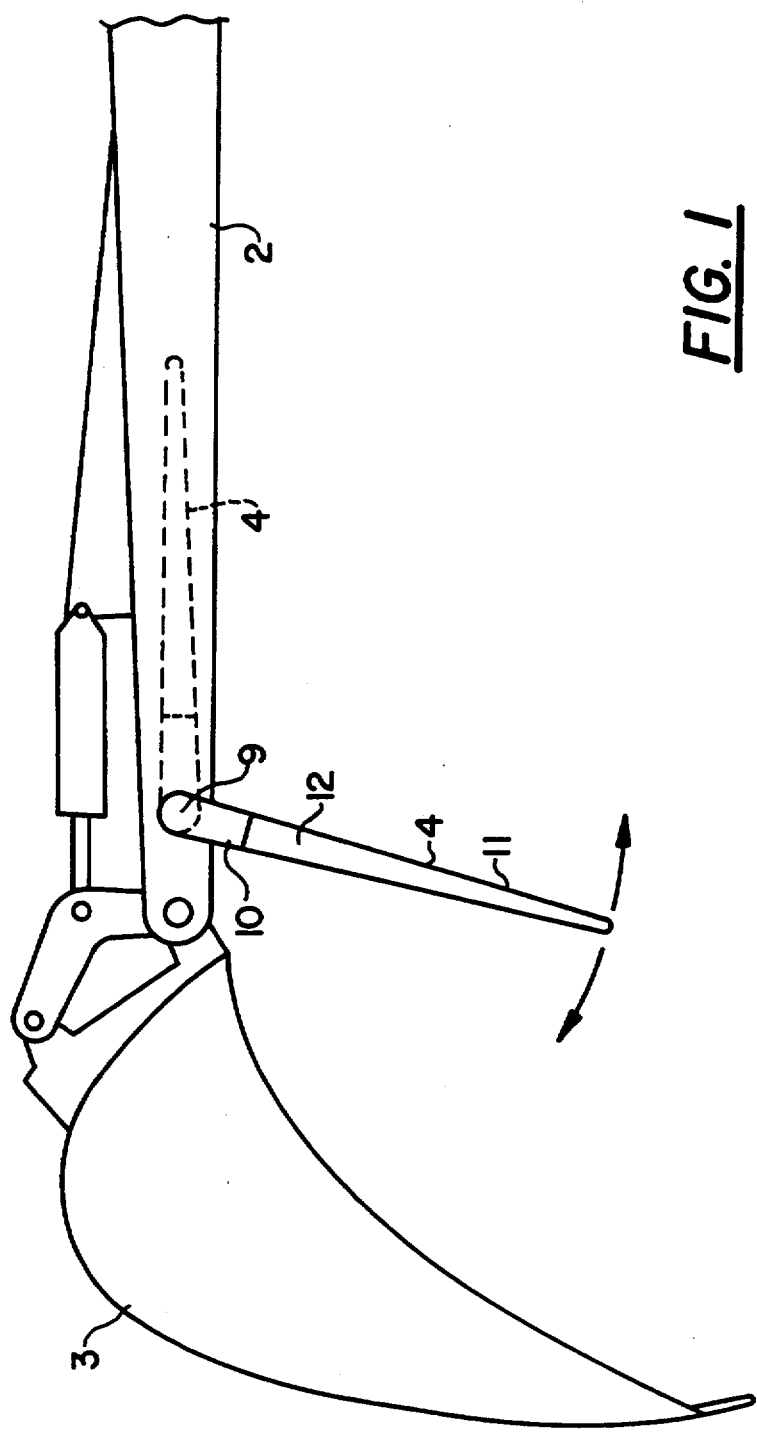
FIG. 1 illustrates schematically the pointer attached to the digging arm of an excavating machine.

FIG. 1 illustrates schematically and in more detail the pointer 4 mounted on the digging arm 2 by means an axle 9 about which the pointer can be swung or pivoted. In its upwardly swung position, its inactive position, shown in broken lines, the pointer 4 is conveniently positioned beneath a robust metal shield which protects the pointer against damage. The pointer of the illustrated embodiment comprises two parts, i.e. an upper part 10 which is pivotal on the axle 9, and a lower part 11 which is pivotal relative to the upper part 10 on a further axle 12, as described in more detail herebelow with reference to FIGS. 2 and 3.

Figure 2:
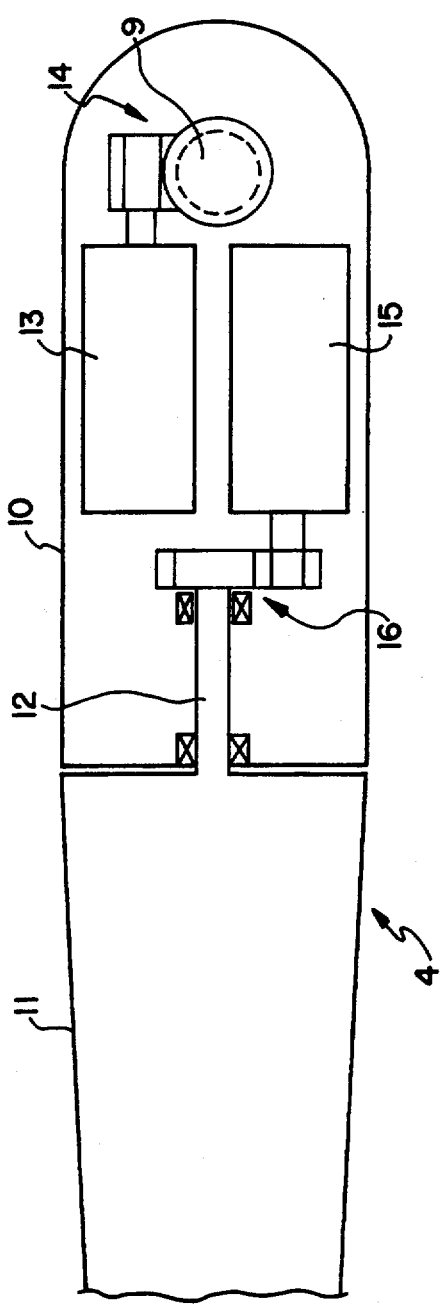
FIG. 2 illustrates schematically a detail of the invention.
Figure 3:
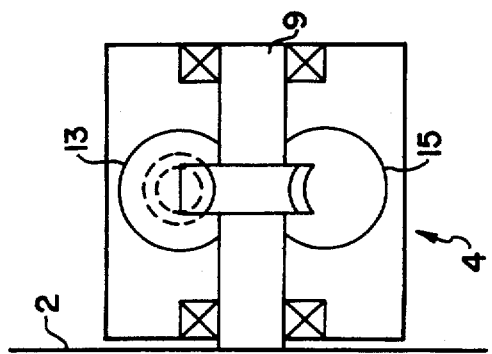
FIG. 3 is a schematic sectional view of the detail illustrated in FIG. 2.

FIG. 2 illustrates schematically the pointer 4 provided with drive means in the form of two servomotors. One servomotor, 13, is connected to the axle 9 through the intermediary of a worm gear 14. The servo motor 13 thus controls the movement of the pointer 4 on the axle 9 so as to direct the pointer constantly towards the cable 5 during the active function of the pointer.

In addition to wishing to know the underground location of the cable, there is also a need to know the geometric extension of the cable. To this end, the pointer comprises two parts and is provided with a marking at its outer, free end. The end of the pointer may thus be flattened, for instance in a wedge-shape, and provided with an enlarged plate—flag—provided with a colour marking or the like, not shown, so as to obtain a direction indication. The axle 12 is therefore driven by a servomotor 15, through the intermediary of a gear 16, and the axle in turn rotates the lower part 11 of the pointer 4. The characteristics of the magnetic field generated by the cable 5 and indicating the length extension of the cable are also recorded in the receiver 6, which controls the servomotor 15 in a manner such as to rotate the lower pointer-part 11 to a position in which the marking will point to or indicate the direction of the cable.

Thus, the invention enables the machine operator to constantly be aware of the location of an underground cable and also the length extension of the cable. This enables the machine operator to avoid digging-up the cable.

It will be understood that the axle 9 need not extend perpendicularly to the digging arm 2 (perpendicular to the plane of the paper in FIG. 1), but may instead be inclined relative to the digging arm. The most essential factor is that the machine operator is able to clearly discern the movements made by the pointer and to see the directions in which the pointer points. The servo motors for effecting movement of the pointer may suitably be driven electrically or hydraulically.

I claim:

1. A pointing device for dynamically indicating location of an underground cable, comprising:
   an elongated pointer having a pivotable mounting provided at one end, for pivotally mounting the pointer to a digging arm of a excavator, and having an opposite, free end for dynamically pointing a direction from said one end towards an underground cable as said digging arm is moved while an excavation is being made, said pivotal mounting being constructed to permit said elongated pointer to rotate about a pivot axis which is generally perpendicular to a longitudinal axis extending between said ends of said elongated pointer;
   a device for sensing location of an underground cable relative to said elongated pointer; and
   a servomotor mechanism effectively coupled between said elongated pointer and said location sensing device, for automatically pivoting said elongated pointer about said pivot axis as said digging arm is moved, in response to sensations received by said location sensing device, so that said elongated pointer tends to remain pointing towards said underground cable.

2. The pointing device of claim 1, wherein:
   said location sensing device is constructed to sense a magnetic field generated by said underground cable.

3. The pointing device of claim 4, wherein:
   said pivot axis is generally horizontal.

4. The pointing device of claim 4, further including:
   a pivot joint formed on said elongated pointer between said two ends, for permitting said opposite, free end to pivot about said longitudinal axis relative to said one end;
   a marker provided on an outer portion of said elongated pointer which is towards said opposite, free end from said pivot joint, said marker being constructed for providing a visual indication of angular orientation of said outer portion of said outer portion about said longitudinal axis;
   said location sensing device being further constructed for sensing direction of extension of said underground cable; and
   said servomotor mechanism is further effectively coupled between said outer portion of said elongated pointer and an inner portion of said elongated pointer, between said pivot joint and said one end, for automatically pivoting said outer portion about said longitudinal axis at said pivot joint, as said digging arm is moved, in response to sensations received by said location sensing device, so that said marker tends to remain in a predetermined spatial relation to said direction of extension of said underground cable.

* * * * *